UNITED STATES PATENT OFFICE.

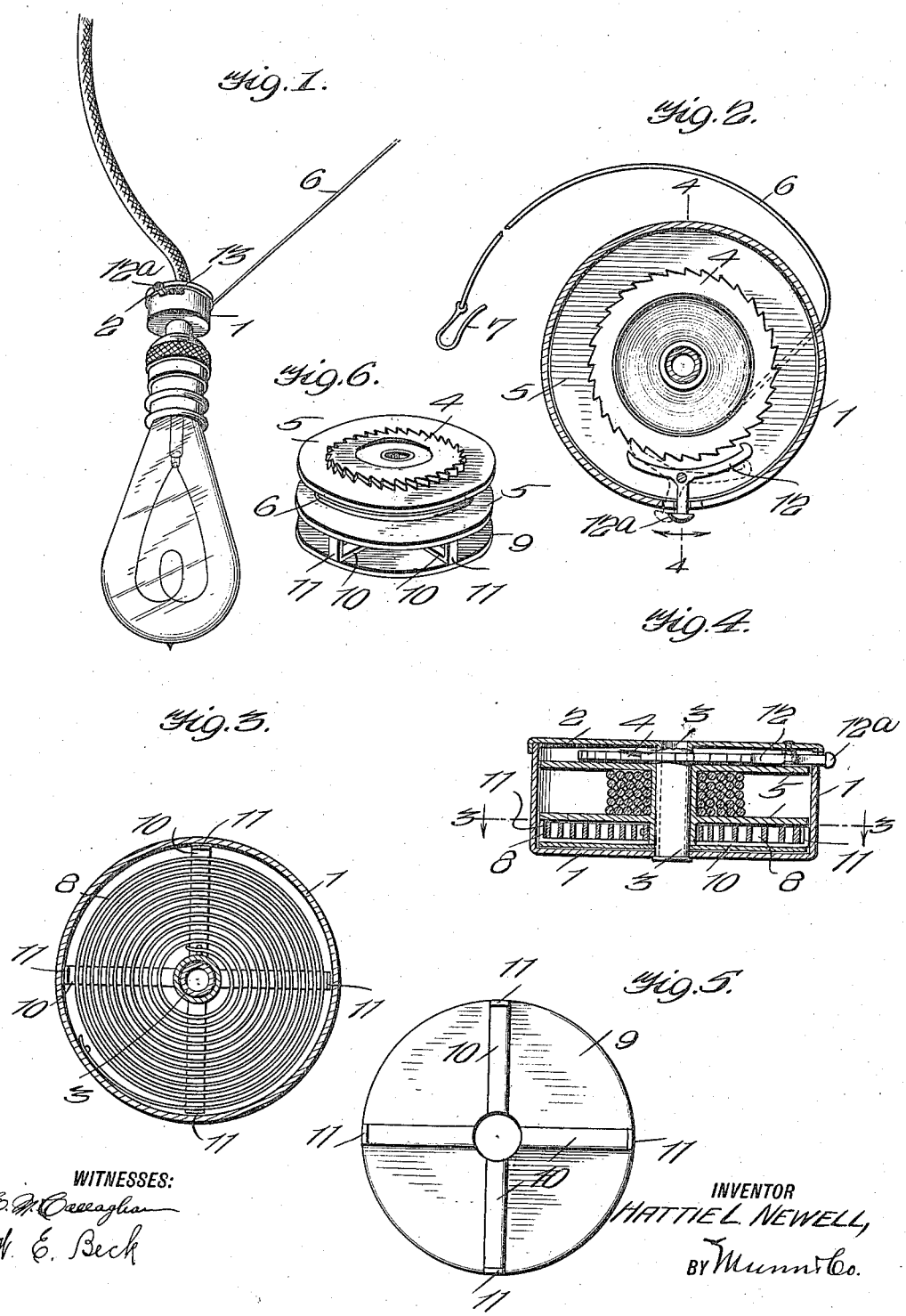

HATTIE LUE NEWELL, OF PARIS, TENNESSEE, ASSIGNOR OF ONE-HALF TO EDGAR S. WIGGINS, OF PARIS, TENNESSEE.

HANGER FOR ELECTRIC LAMPS.

1,163,444.   Specification of Letters Patent.   Patented Dec. 7, 1915.

Application filed June 10, 1915. Serial No. 33,392.

*To all whom it may concern:*

Be it known that I, HATTIE L. NEWELL, a citizen of the United States, and a resident of Paris, in the county of Henry and State of Tennessee, have made an Improvement in Hangers for Electric Lamps, of which the following is a specification.

My invention is an improvement in that type of hangers for electric lamps which may be raised and lowered to suit convenience.

My invention is distinguished by simplicity and cheapness of construction, and by adaptation for suspension from a tack, nail, or screw, so that it may be conveniently transferred from one portion of a room to another.

The details of construction, arrangement, and operation of parts are as hereinafter described, and illustrated in the accompanying drawing, in which—

Figure 1 is a perspective view of my hanger attached to and supporting an incandescent lamp. Fig. 2 is a plan view of the hanger with cap or cover removed. Fig. 3 is a horizontal section on the line 3—3 of Fig. 4. Fig. 4 is a central transverse section on the line 4—4 of Fig. 2. Fig. 5 is a plan view of the spring holder or support. Fig. 6 is a perspective view including the chain reel or spool, together with ratchet, and the spring holder.

The sheet metal casing of the holder comprises a main or cup-shaped portion 1, and a flanged cap 2; see especially Fig. 4. Within the casing are arranged all the operative parts of the device. The cap 2 is provided with a tube 3 which extends through the bottom of the cup-shaped body 1. On this tube are mounted a ratchet 4 and a reel or spool 5, the two being secured together. A suspending chain or cord 6, which is provided at its outer extremity with a hook 7, as shown in Fig. 2, passes through the side of the casing and winds around the hub of the reel or spool 5. The latter comprises the hub portion and two parallel disk-like flanges. Below the lower flange is arranged the coiled, ribbon spring 8, one end of which is attached to an extension of the spool hub, and the other end to the body 1 of the casing—see Fig. 3. The spring is supported on a holder 9 (see Figs. 4, 5, 6.) The same comprises a disk or plate, and a series of radial ribs 10 having upturned outer ends 11, as shown particularly in Figs. 4 and 6. By providing this form of support, the spring encounters less friction than it would if allowed to rest directly on the bottom of the casing.

The ratchet 4 is secured by solder, or otherwise, directly to the upper flange of the spool, and a double pawl 12 is pivoted to the cap 2, and provided with a knob-head $12^a$ which projects through the side of the casing 1, as shown in Figs. 1, 2, 4. One end of the pawl proper 12 is hook-shaped, and the other is pointed and curved inward.

Notches 13 are provided in the body of the casing for reception and engagement of the projecting knob portion $12^a$. Thus, when the pawl is adjusted with the knob portion in the middle notch, the pawl is out of engagement with the ratchet; but, when adjusted in either of the other notches, one end or the other of the pawl will be engaged with, and lock, the ratchet, correspondingly, which is the same thing as locking the reel or spool, since the ratchet is rigidly connected with the latter.

It will now be understood that the device, that is to say, the lamp-holder, having been applied to the conductor of a lamp, which passes through the tube 3, as shown in Fig. 1, the cord or chain 6 is used to suspend the holder from a tack, nail, screw or other device at any point where convenience suggests locating the lamp. The pawl being set at disengagement as shown in Fig. 2, it is apparent the cord or chain may be pulled off the reel to any required extent, the spring 8 being at the same time wound up to a corresponding degree. Then, the pawl being released from the central position and adjusted in one of the lateral positions, as indicated by dotted lines, Fig. 2, it locks the ratchet and thereby the spool, so that the tension of the spring is counteracted. It is evident that, upon release of the pawl from the ratchet by adjusting it as shown in full lines, Fig. 2, the spring will wind up the reel or spool so that the hanger with the lamp attached may be suspended out of the way.

As will be understood by reference to Fig. 2, the cap 2 and central tube 3 which receives the cord or lamp conductor being made integral or rigidly connected, they may be readily detached from the body 1 of the casing, together with all the other interior portions of the device comprising the parts 4, 5, 6, 9, 10, when access to, or removal of, the interior parts is desired.

I claim:—

1. The improved electric lamp hanger comprising a cylindrical casing having a central tube for reception of a lamp cord, a reel or spool with ratchet mounted rotatably on said tube, adapted to have a suspending cord wound thereon, a pawl for engaging the ratchet and a coil spring attached to the spool and the casing at its respective ends, as described.

2. The improved hanger comprising a casing having a detachable cap provided with a central tube, a ratchet and spool secured together and mounted rotatably on said tube adapted to have a suspending cord wound thereon, a spring connected at its respective ends with the casing and the spool, and tending to rotate the spool, and a pawl pivoted to the casing and adapted to engage the ratchet, the casing being provided with notches adapted to receive the operating arm of the pawl whereby it may be held in engaged or disengaged position, as described.

HATTIE LUE NEWELL.

Witnesses:
J. H. DALE,
W. I. DALE.